(12) United States Patent
Gupta

(10) Patent No.: US 8,943,001 B1
(45) Date of Patent: *Jan. 27, 2015

(54) POST-PAID, SINGLE CLICK PAYMENTS

(71) Applicant: Google Inc., Mountain View, CA (US)

(72) Inventor: Vikas Gupta, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,148

(22) Filed: Jun. 18, 2013

Related U.S. Application Data

(63) Continuation of application No. 13/344,455, filed on Jan. 5, 2012, now Pat. No. 8,498,939.

(60) Provisional application No. 61/535,466, filed on Sep. 16, 2011.

(51) Int. Cl.
G06Q 40/00 (2012.01)
G06Q 30/06 (2012.01)
G06Q 20/40 (2012.01)

(52) U.S. Cl.
CPC ............ G06Q 30/0637 (2013.01); G06Q 20/40 (2013.01)
USPC ................................ 705/44; 705/39; 705/40

(58) Field of Classification Search
None
See application file for complete search history.

(56) References Cited

U.S. PATENT DOCUMENTS

| | | | |
|---|---|---|---|
| 5,878,141 A * | 3/1999 | Daly et al. ........................ | 705/78 |
| 6,678,664 B1 * | 1/2004 | Ganesan .......................... | 705/39 |
| 7,107,249 B2 * | 9/2006 | Dively et al. .................... | 705/74 |
| 7,324,976 B2 | 1/2008 | Gupta et al. | |
| 7,353,203 B1 * | 4/2008 | Kriplani et al. ................. | 705/39 |
| 7,383,231 B2 | 6/2008 | Gupta et al. | |
| 7,502,760 B1 | 3/2009 | Gupta | |
| 7,584,152 B2 | 9/2009 | Gupta et al. | |
| 7,729,994 B2 | 6/2010 | Gupta et al. | |
| 7,742,994 B1 | 6/2010 | Gupta | |
| 7,778,457 B2 | 8/2010 | Nepomniachtchi et al. | |
| 8,315,945 B1 | 11/2012 | Gupta | |
| 8,498,939 B1 * | 7/2013 | Gupta ............................. | 705/44 |
| 2002/0156731 A1 * | 10/2002 | Seki et al. ....................... | 705/40 |
| 2002/0194121 A1 * | 12/2002 | Takayama ........................ | 705/39 |
| 2003/0088512 A1 * | 5/2003 | Hoter-Ishay .................... | 705/40 |
| 2003/0127299 A1 | 7/2003 | Jones et al. | |
| 2003/0195842 A1 * | 10/2003 | Reece ............................. | 705/39 |
| 2004/0019528 A1 * | 1/2004 | Broussard et al. .............. | 705/26 |
| 2004/0122767 A1 * | 6/2004 | Sanchez .......................... | 705/40 |
| 2004/0188221 A1 | 9/2004 | Carter | |

(Continued)

FOREIGN PATENT DOCUMENTS

WO  WO 03/071386 A2  8/2003

OTHER PUBLICATIONS

Lemieux, J., Office Action issued in copending U.S. Appl. No. 13/080,483, filed Apr. 5, 2011, pp. 1-10, Aug. 14, 2012.

(Continued)

Primary Examiner — Gregory Johnson
(74) Attorney, Agent, or Firm — Johnson, Marcou & Isaacs, LLC

(57) ABSTRACT

A deferred payment authorization system that allows users to exercise an instant purchase, deferred payment option for online payment without providing payment information. multiple transaction costs for frequent or recurring purchases can be reduced to a single transaction that can be processed offline at the user's convenience, particularly for small, online purchases made on a frequent or reoccurring basis.

32 Claims, 3 Drawing Sheets

(56) References Cited

U.S. PATENT DOCUMENTS

| | | | |
|---|---|---|---|
| 2005/0144128 A1 | 6/2005 | McCoppin et al. | |
| 2005/0165682 A1 | 7/2005 | Duke | |
| 2005/0167481 A1* | 8/2005 | Hansen et al. | 235/379 |
| 2006/0080198 A1 | 4/2006 | Doyle | |
| 2006/0195398 A1* | 8/2006 | Dheer et al. | 705/40 |
| 2007/0029378 A1 | 2/2007 | Begola | |
| 2007/0136189 A1* | 6/2007 | German et al. | 705/39 |
| 2007/0136191 A1 | 6/2007 | Itwaru | |
| 2007/0156579 A1 | 7/2007 | Manesh | |
| 2007/0219000 A1 | 9/2007 | Aida | |
| 2007/0271147 A1* | 11/2007 | Crespo et al. | 705/26 |
| 2008/0010204 A1 | 1/2008 | Rackley, III et al. | |
| 2008/0015985 A1 | 1/2008 | Abhari et al. | |
| 2008/0103972 A1* | 5/2008 | Lanc | 705/44 |
| 2008/0255993 A1 | 10/2008 | Blinbaum | |
| 2009/0210299 A1* | 8/2009 | Cowen | 705/13 |
| 2009/0236200 A1 | 9/2009 | Hallowell et al. | |
| 2009/0236201 A1 | 9/2009 | Blake et al. | |
| 2009/0240620 A1* | 9/2009 | Kendrick et al. | 705/39 |
| 2009/0292619 A1* | 11/2009 | Kagan et al. | 705/26 |
| 2009/0313147 A1* | 12/2009 | Balasubramanian et al. | 705/30 |
| 2010/0094727 A1* | 4/2010 | Shapiro | 705/27 |
| 2010/0106586 A1* | 4/2010 | Etheredge et al. | 705/14.18 |
| 2010/0153265 A1* | 6/2010 | Hershfield et al. | 705/40 |
| 2010/0198733 A1 | 8/2010 | Gantman et al. | |
| 2010/0312645 A1* | 12/2010 | Niejadlik et al. | 705/14.55 |
| 2011/0035302 A1* | 2/2011 | Martell et al. | 705/34 |
| 2011/0106675 A1 | 5/2011 | Perlman | |
| 2011/0218880 A1* | 9/2011 | Hammad et al. | 705/26.41 |
| 2011/0276418 A1* | 11/2011 | Velani | 705/16 |
| 2011/0276478 A1* | 11/2011 | Hirson et al. | 705/40 |
| 2011/0288999 A1 | 11/2011 | McGraw et al. | |
| 2012/0016728 A1* | 1/2012 | Ahmad et al. | 705/14.23 |
| 2012/0023021 A1* | 1/2012 | Seifert et al. | 705/43 |
| 2012/0041870 A1* | 2/2012 | Baskerville | 705/39 |
| 2012/0058817 A1 | 3/2012 | Amour | |
| 2012/0095855 A1* | 4/2012 | Sterling | 705/16 |
| 2012/0157062 A1* | 6/2012 | Kim et al. | 455/414.1 |
| 2012/0158581 A1* | 6/2012 | Cooley et al. | 705/40 |
| 2012/0173322 A1* | 7/2012 | Ringewald et al. | 705/14.16 |
| 2012/0173351 A1 | 7/2012 | Hanson et al. | |
| 2013/0006872 A1 | 1/2013 | Chandoor et al. | |

OTHER PUBLICATIONS

Lemieux, J., Office Action issued in copending U.S. Appl. No. 13/244,778, filed Sep. 26, 2011, pp. 1-11, Mar. 12, 2012.

Perry, L., Office Action issued in copending U.S. Appl. No. 13/344,588, filed Jan. 5, 2012, pp. 1-27, Apr. 16, 2013.

Adams, John, Mitek's Photo Finish for Mobile Payments, Bank Technology News, American Banker and Source Media, Oct. 1, 2010.

Johnson, G., Office Action issued in copending U.S. Appl. No. 13/344,455, filed Jan. 5, 2012, pp. 1-19, Nov. 2, 2012.

Perry, "Office Action issued in copending U.S. Appl. No. 13/344,588, filed Jan. 5, 2012", Jan. 15, 2014, 1-33.

* cited by examiner

POST-PAID, SINGLE CLICK PAYMENTS

RELATED APPLICATIONS

This application is a continuation of and claims priority to U.S. patent application Ser. No. 13/344,455, filed Jan. 5, 2012 and entitled "Post-Paid, Single Click Payments," which claims priority to U.S. Provisional Patent Application No. 61/535,466, filed Sep. 16, 2011 and entitled "Post-Paid, Single Click Payments." The entire contents of each of the above-identified priority applications are hereby fully incorporated herein by reference.

TECHNICAL FIELD

The present disclosure relates generally to a system for purchasing a product with a deferred payment option, and more particularly to methods and systems that reduce multiple transaction costs, especially for small online purchases made on a frequent or reoccurring basis, to a single offline purchase transaction.

BACKGROUND

Consumers purchase an increasing amount of products online, and an increasing amount of these products constitute low-cost items purchased on a frequent or reoccurring basis. For example, over the course of the day, a user may purchase multiple sources of content, such as a new ringtone for their mobile phone, new songs and videos, subscribe to or access news or magazine articles, and purchase virtual goods in a social network or other online gaming environments. For each item purchased, the user must first provide payment information, either at the time of purchase or by having previously submitted and stored the payment information with each content provider. The purchase information must first be processed and approved before the user can access the purchased item. Currently, users cannot enjoy a true one-click purchasing option across multiple online platforms. Accordingly, there is a need in the art for methods and systems that allow users to quickly access content, while reducing the multiple associated transaction costs to fewer, and perhaps one, purchase transaction that can be made at the user's convenience.

SUMMARY

In certain exemplary aspects, a method of authorizing instant purchases without payment information includes receiving a request for instant purchase approval from a user and authorizing instant purchase approval based on the user's prior account activity. The user's prior account activity may include a length of time the user has maintained an open or active account. The user's prior account activity also may be based on the user's prior activity, payment history, use of associated online services, or other suitable information allowing an estimate of the user's likelihood to pay for the transaction. For example, the systems and methods may be integrated with other online services, such as email, cloud-computing services, electronic payment services, and social networking or gaming services. The user's prior activity on these associated services may be used as a basis for approving the instant purchase, deferred payment option of the present invention. Once approved, the user is able to immediately access and utilize the purchased content, allowing the user to make multiple purchases without processing payment information for each purchase. The user may then submit a single payment for each purchase at a later date and at their convenience. In certain exemplary embodiments, the user's account may have an account balance or time limit on outstanding payments that must be paid current before additional instant purchases can be authorized.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
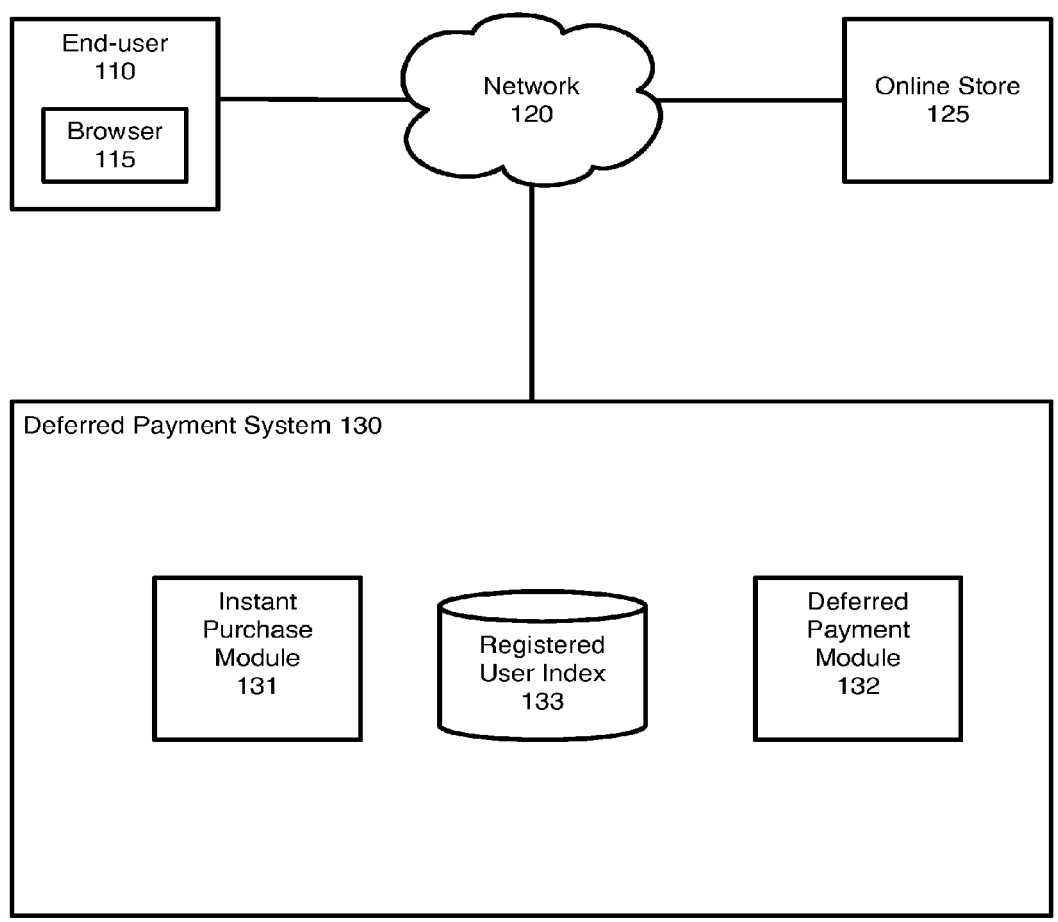
FIG. 1 is a block diagram depicting a deferred payment system according to an exemplary embodiment.

The methods and systems described herein can enable consumers and merchants to reduce the transaction costs associated with common purchases, some of which may be made on a frequent or reoccurring basis. The systems and methods can reduce the transaction costs associated with frequent or regular small-value online purchases, such as the purchase of music, ring tones, newspaper and magazine articles or issues, books, television shows, movies, and virtual goods associated with social network games or other online gaming applications. However, the instant purchase, deferred payment option of the present invention is not necessarily limited by dollar amount. A user registers with the system of the present invention and an online record is created. The online record is associated with a purchase history of the user. Once registered, the user may purchase items through the system's instant purchase, deferred payment option. The system interfaces with online stores and presents to the user the ability to elect the instant purchase, deferred payment option when making a purchase. Once approved, the user is free to access and use the purchased content without payment and without further processing of payment information. The user is notified of their outstanding balance and allowed to make payment offline at the user's convenience.

In certain exemplary embodiments, the user may be required to have established a certain number of purchases using standard payment options or otherwise maintained an active account for a defined time period to utilize the instant purchase, deferred payment option of the present invention. Alternatively, or in addition to requiring a certain level of previous account activity or maturity, the system also may limit the balance that may be accrued through the instant purchase, deferred payment option before payment is required. However, unlike other payment options, payment information does not have to be presented, processed, or otherwise maintained with an online store. The system of the present invention may be integrated with other online systems providing such services as email, cloud computing, electronic payments, social networking, or other online services. Accordingly, the present invention may utilize the user's activity associated with these other integrated services as a basis for determining whether a user qualifies for the instant purchase, deferred payment option provided by the present invention.

An exemplary deferred payment system may comprise an instant purchase module, a deferred payment module 132, and a registered user index. The instant purchase module communicates with online stores and generates a user interface that allows a user to select the instant purchase, deferred payment option when purchasing products online. The user interface may be a control button with which the user can select the instant purchase, deferred payment option. The instant purchase module receives requests for instant purchases and verifies if the corresponding user is a registered user by referencing the registered user index. If a user is not registered, the instant purchase module requests and receives a user's registration information. User registration information is stored in the registered user index which further maintains the balance associated with each user's account and a purchase history. The instant purchase module verifies, based on the user's record, whether an instant purchase with deferred payment may be approved and communicates this determination to the user. If approved, the deferred payment module 132 handles instant payment with the merchant on behalf of the user and creates a transaction record in the user's account. The deferred payment module 132 generates a notice for each user updating the user on the outstanding balance as purchases are made. The deferred payment module 132 further generates a user interface where users can enter payment information to pay outstanding balances as required. The deferred payment module 132 may further interface with banking or other payment processing systems to process the necessary transfer of funds between the deferred payment system and the merchant and between and the user's credit or banking accounts and the deferred payment system.

As used throughout this specification, the term "product" should be interpreted to include tangible and intangible products, as well as services.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act. The inventive functionality of the invention will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

FIG. 1 is a block diagram depicting a product annotation system 100 according to an exemplary embodiment. As depicted in FIG. 1, the system 100 includes network devices 110, 125, and 130 that are configured to communicate with one another via one or more networks 120.

Each network 120 includes a wired or wireless telecommunication means by which network devices (including devices 110, 125, 130) can exchange data. For example, each network 120 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 110, 125, 130 includes a device having a communication module capable of transmitting and receiving data over the network 120. For example, each network device 110, 125, 130 can include a server, desktop computer, laptop computer, tablet computer, smart phone, handheld computer, personal digital assistant ("PDA"), or any other wired or wireless, processor-driven device. In the exemplary embodiment depicted in FIG. 1, the network devices 110, 125, and 130 are operated by end-users or consumers, online merchants, and a deferred payment system operator, respectively. Although only a single end-user network device 110 and online store network device 125 are depicted for convenience in FIG. 1, multiple end-user network devices 110 and online stores 125 are contemplated by the invention.

The end user network devices 110 may each include an application module 115. The application module 115 may be a browser application, such as Microsoft Internet Explorer, Firefox, Netscape, Google Chrome, Safari, or another suitable application for interacting with web page files maintained by the deferred payment system 130, the online store network device 125, and/or other network devices. The web page files can include text, graphic, images, sound, video, and other multimedia or data files that can be transmitted via the network 120. For example, the web page files can include one or more files in the Hypertext Markup Language ("HTML"). The browser application module 115 can receive web page files from the deferred payment system 130 and the online store network device 125 and can display web page files to end users operating the end user network devices 110.

In certain exemplary embodiments, the deferred payment system 130 comprises an instant purchase module 131, a deferred payment module 132, and a registered user index 133. In certain exemplary embodiments, the instant purchase module 131 processes instant purchase, deferred payment request from users. The instant purchase module 131 is in communication with the registered user index 133 and verifies that the user is registered, that the user's account is approved for the instant purchase, deferred payment option, and whether any purchase limits have been reached. The instant purchase module 131 completes a transaction with the online store network device 125 on behalf of the user, thereby allowing the user to have instant access to the product of the online store network device 125. Then, the deferred payment module 132 updates the user's account in the registered user index 133 and seeks future payment for the product. The deferred payment module 132 sends notices to the user updating the user of an outstanding balance and generates the interfaces necessary for the user to check the account balance and to submit payment information.

The deferred payment system 130 is described in more detail hereinafter with reference to the methods depicted in FIGS. 2-3.

System Process

Figure 2:
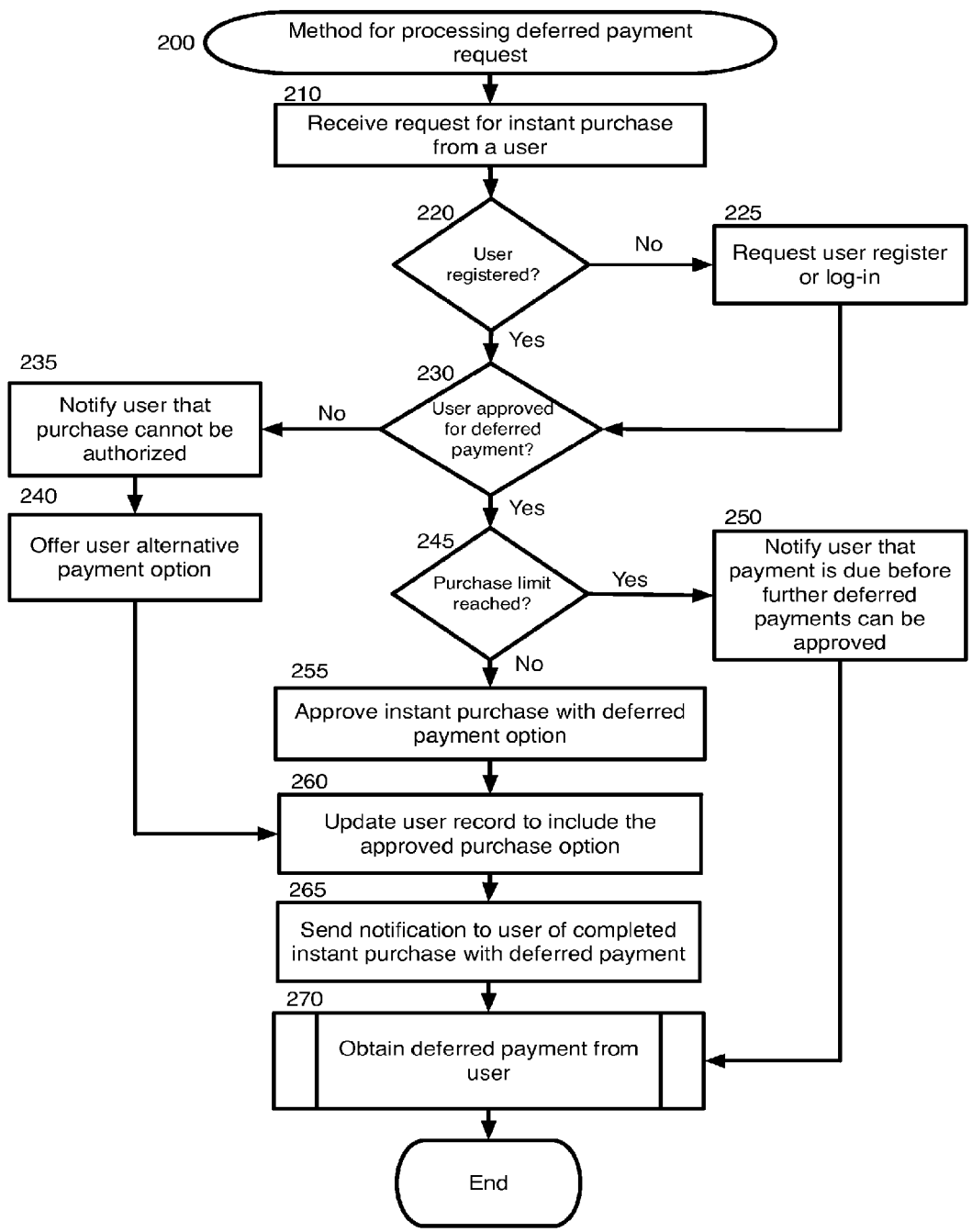
FIG. 2 is a block flow diagram depicting a method for processing a deferred payment request according to an exemplary embodiment.

FIG. 2 is a block flow diagram depicting a method 200 for processing instant purchase, deferred payment requests. The method 200 is described with reference to the components illustrated in FIG. 1.

At block 210, the instant purchase module 131 receives a request from a user to utilize the instant purchase, deferred payment option to make an online purchase. In an exemplary embodiment, the user may request the instant purchase, deferred payment option by utilizing an instant purchase, deferred payment option control displayed a web page generated on an online store's web page at the time of purchase. For example, the user may utilize browser application 115 on the end-user network device 110 to access, via the network 120, the web page of the online store from the online store network device 125. The control on the online store's web page is linked to the deferred payment system 130 such that the selection of the control is communicated to the instant purchase module 131.

At block 220, the instant purchase module 131 determines if the request is from a registered user. The user's registration information, if any, can be transmitted to the instant purchase module 131 at the time of the request. This information may be requested automatically at the time of making the instant purchase, deferred payment request. For example, after selecting the instant purchase, deferred payment option using the instant purchase, deferred payment option control, a prompt may be presented requesting the user's registration information. The instant purchase module 131 may prompt the user to login to the deferred payment system 130 or otherwise to present the user's registration information. In this regard, the instant purchase module 131 may communicate the prompt directly to the user via the end-user network device 110 or indirectly to the user via the online store network device 125. Alternatively, the registration information may be retained in a client side data structure, such as a cookie and automatically transmitted to the deferred payments system 130 with each request. The instant purchase module 131 utilizes the user registration information to confirm that the user has an account with the deferred payment system 130 via cross reference to the registered user index 133.

If the instant purchase module 131 determines in block 220 that registration information is not received, the method 200 proceeds to block 225. At block 225, the instant purchase module 131 notifies the user and requests that the user either register to create an account or log in with the user's existing registration information. Upon the user's completion of block 225, the method 200 proceeds to block 230.

Referring back to block 220, if the instant purchase module 131 determines in block 220 that the registration information has been received, then the method 200 proceeds directly to block 230.

At block 230, the instant purchase module 131 uses the registration information to determine if the user is approved to utilize the instant purchase, deferred payment option by examining the user's account history stored in the registered user index 133. In certain exemplary embodiments, the method 200 may require the user account to have been active for a pre-defined period of time before the instant purchase, deferred payment option can be used. Where the method 200 is integrated with other online services, the length of time the user has had an active account with one or more of the other integrated online services may be used to determine if approval to use the instant purchase feature is granted. In another exemplary embodiment, the method 200 may require that a certain number of purchases or a certain frequency of purchases using other standard payment options be achieved before the instant purchase, deferred payment option is approved. In yet another exemplary embodiment, the method 200 may utilize an honor score to determine if a user is approved for the deferred payment option. The honor score reflects a trust level associated with a given user and determined based on past deferred payment transaction history. Determining and updating an honor score is discussed in further detail hereinafter with reference to block 345 of FIG. 3. The deferred payment system 130 operator may configure desired approval requirements for approving instant purchase, deferred payment transactions. Once the requisite approval criteria have been met, the user's account may be activated as pre-approved for future instant purchase, deferred payment requests.

If the user is not approved for an instant purchase with deferred payment, the method 200 proceeds to block 235. At block 235, the instant purchase module 131 notifies the user that the requested instant purchase with deferred payment cannot be approved. The notification may include a summary of why the purchase was not approved and what steps the user may take to fully qualify for the instant purchase, deferred payment option.

Then, at block 240, the instant purchase module 131 offers the user the opportunity to select an alternative purchase option. One alternative option is for the user to complete the purchase directly with the online store network device 125 pursuant to the online stores accepted methods of payment. In certain exemplary embodiments, the instant purchase module 131 may communicate with the online store network device 125 to receive confirmation of a completed purchase using an alternative payment option. Another alternative method is for the user to complete the purchase via the deferred payment system 130 but by providing payment at the time of purchase. For example, the instant purchase module 131 may invite the user in the notification of block 235 to enter the user's credit card or other payment information. The instant purchase module 131 may then communicate this information to the online store network device for further processing and request notice of the completed purchase. The user's decision to pay with an alternate payment option is noted by the instant purchase module 131 in the user's account record, as further described hereinafter with reference to block 260.

Referring back to block 230, if the user is approved for instant purchase with deferred payment, the method 200 proceeds to block 245. At block 245, the instant purchase module 131 determines whether the user is authorized for additional instant purchases with deferred payment. For example, the instant purchase module 131 checks the user's existing account balance in the registered user index 133 to determine if that balance is below a pre-defined account balance limit. The account balance limit is configurable by the operator of the deferred payment system 130. For example, the account balance limit may vary by user and can depend on such criteria as the length of time the user's account has been in use or the user's deferred payment history associated with previous instant purchases. The account balance limit can prevent a particular user from exposing the deferred payment system to excessive liability for uncollected deferred payments.

If the user has exceeded the deferred payment limit, or the current transaction will cause the user to exceed the deferred payment limit, the method 200 proceeds to block 250. At block 250, the instant purchase module 131 notifies the user that payment of past purchases is due before further deferred payments can be approved, for example, by communicating a notice to the user's end-user network device 110 via the network 120. The user is then directed to the deferred payment process, which is described in further detail hereinafter with reference to block 270.

Referring back to block 245, if the user has not reached the deferred payment purchase limit, the method 200 proceeds to block 255. At block 255, the instant purchase module 131 notifies the user that the instant purchase with deferred payment is approved, by communicating a notice to the user's end-user network device 110 via the network 120 or by communicating a notice to the online store network device 125 for presentation to the user. The instant purchase module 131 communicates this approval to the online store network device 125, and the online store network device provides instant access to the purchased content.

In an exemplary embodiment, the online store operator and the deferred payment system operator can agree how to complete payments for user's that qualify for the instant purchase, deferred payment option. For example, the deferred payment system 130 can accumulate multiple approved purchases for a particular online store. Then, the deferred payment system 130 can initiate a payment to an account of the online store at a specified time period, such as after a certain number of hours, once each day, once each week, or at another suitable time period. Alternatively, or additionally, the deferred payment system 130 can initiate a payment to an account of the online store when the value of accumulated purchases reaches a predetermined threshold amount. In any event, the online store network device 125 considers the product purchased by the user when the deferred payment system provides the approval notice to the online store network device 125.

At block 260, the instant purchase module 131 update the user's record in the registered user index to indicate either the approved instant purchase of block 255 or the alternative payment completed via block 240. This information may then be utilized by the system when determining whether to approve future instant purchase requests from the user and selecting the appropriate account balance limit. Additionally, the updated information includes the current account balance owed by the user, which the user must pay as described hereinafter in block 270.

At block 265, the instant purchase module 131 communicates notification to the user that the instant purchase with deferred payment is completed and that the user may access the purchased product. In certain exemplary embodiments, the content may be provided directly to the user concurrently with the notification. The notification also can include the user's current balance and information for authorizing payment of the user's outstanding balance. In an exemplary embodiment, the instant purchase module 131 can communicate the notification directly to the user network device 110. Alternatively, or additionally, the instant purchase module can communicate the notification to the online store network device 125 for presentation to the user network device 110.

At block 270, the deferred payment module 132 processes a user's payment offline and after the approved instant purchases with deferred payment. Block 270 will be described in further detail hereinafter with reference to FIG. 3.

Figure 3:
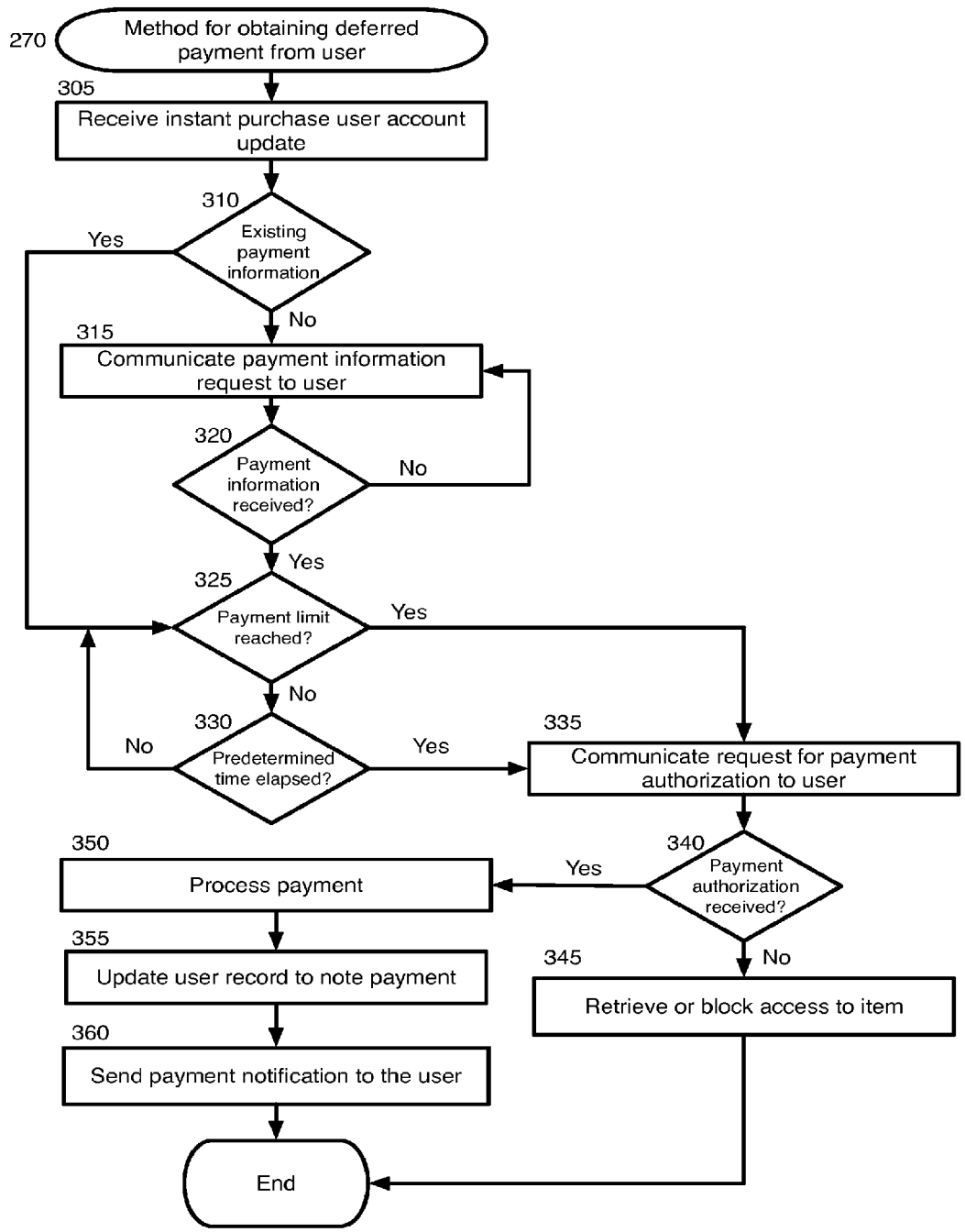
FIG. 3 is a block flow diagram depicting a method for obtaining deferred payment from a user according to an exemplary embodiment.

FIG. 3 is a block flow diagram depicting a method for obtaining deferred payment from a user according to an exemplary embodiment, as referenced in block 270 of FIG. 2. Thus, FIG. 3 describes the process 270 by which a single transaction is used to obtain payment for one or multiple transactions processed through the instant purchase, deferred payment option of the deferred payment system 130.

At block 305, the deferred payment module 132 receives notice from the instant purchase module 131 of an approved purchase for a user. deferred payment module 132

At block 310, the deferred payment module 132 determines whether existing payment information is on file in the user's account information stored in the registered user index 133. The user may submit approved payment information and may pre-authorize any required payments to be processed with the approved payment information when payment is due. Alternatively, the user may submit payment information, but request that the deferred payment module 132 request user authorization before proceeding to process the payment. The deferred payment module 132 may communicate this notification, when necessary, to the instant purchase module 131 for inclusion in the user notification described in FIG. 2 at block 250. If payment information is available and the user has authorized payment, the method proceeds according to block 325 discussed in further detail hereinafter. Payment information may comprise any suitable payment method provided by the user. For example, payment information can be an authorization to charge a user's credit card, bank account, or other account to pay costs associated with the user's instant purchase, deferred payment transactions.

At block 315, if payment information is not associated with the user's record, the deferred payment module 132 sends a notification to the user requesting payment information, by communicating the notification to the end-user network device 110. This notification can be in the form of an email, a text message, a pop-up window, a notice within the browser application 115, or any other suitable method of notifying the user.

At block 320, the deferred payment module 132 determines if payment information has been received from the user. For example, the user may input the payment information into the end-user network device 110, which then communicates the payment information to the deferred payment system 130. If payment information has not been received by the deferred payment system 130, the deferred payment module 132 will wait and may continue to notify the user of the need to provide payment information through additional notifications as described above in reference to block 315. When the deferred payment system 130 has received the payment information, the method 270 proceeds to block 325. The payment information is stored with the user's account record in the registered user index 133.

At block 325, the deferred payment module 132 determines if the account balance limit associated with the user's account record will be exceeded or reached by the current purchase. If the account limit will be reached or exceed, the payment is processed as described in further detail hereinafter at block 335.

At block 330, if the account balance limit will not be reached or exceeded, the deferred payment module 132 determines if a pre-determined time limit on existing account balances has elapsed. For example, the deferred payment system 130 may require all approved instant purchases be paid current within 1 day, 1 week, 1 month, 30 days, or other configurable time period of purchase regardless of whether the existing account balance limit has been reached. If the pre-determined time period has elapsed, the deferred payment module 132 processes the payment as described in further detail hereinafter at block 335. If the pre-determined time period has not elapsed, the method 270 returns to block 325 to wait for either the payment limit to be reached or exceeded via a subsequent transaction or for the predetermined time period to elapse.

At block 335, the deferred payment module 132 communicates a request for payment authorization to the end-user network device 110 for presentation to the user. In an exemplary embodiment, the deferred payment module 132 may generate a user interface that allows a user to log on and submit payment authorization at a dedicated URL. In certain exemplary embodiments, if the user has previously configured the user's account to process payments without further notice, block 335 may be omitted, and the method 270 may proceed directly to block 350. If the user has not previously configured the user's account to process payments automatically, the user will need to access the deferred payment module 132 to authorize the payment. In certain other exemplary embodiments, the user may authorize and enter alternate payment information from that currently associated with the user account.

At block 340, the deferred payment module 132 determines whether payment authorization is received. For example, the deferred payment module 132 may note the time when the payment authorization was communicated to the user and leave the request open for a pre-defined period of time. If payment authorization is received, the payment is processed as described in further detail hereinafter with reference to blocks 350 to 360.

At block 345, if the payment has not been received, the deferred payment module 132 may block or retrieve the item purchased using the deferred payment option. In an exemplary embodiment, the deferred payment module 131 can communicate a termination notification directly to the user network device 110. Alternatively, or additionally, the deferred payment module 132 can communicate the notification to the online store network device 125 for communication to the user network device 110. In certain exemplary embodiments, the deferred payment module 132 may further update an honor score associated with the user record stored in the registered user index 133. In certain exemplary embodiments, each user record can be associated with a default honor score. In certain other exemplary embodiments, the honor score can be varied by user depending on a trust level that can be determined for each user. For each instance of failed payment, the deferred payment module 132 may reduce the honor score by a pre-determined amount and update the user record to reflect the honor score. The instant purchase module 131 may then access this information when determining whether a user is approved for deferred payment, such as at block 230 at FIG. 2 discussed above. If the honor score is below a pre-defined threshold, the instant purchase module 131 will not authorize future deferred payments.

At block 350, when a user has accessed the deferred payment module 132 to pay the account balance, or when the criteria of one or more of blocks 325, 330, and 340 have been met, the deferred payment module 132 processes payment using the payment information provided by the user.

At block 355, the deferred payment module 132 updates the user's record to note payment and to re-set the account balance and any applicable time limits associated with the account.

At block 360, the deferred payment module 132 notifies the user that their payment has been successfully processed. The notification also may include a notice indicating the user's new account balance.

General

The exemplary methods and blocks described in the embodiments presented herein are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for authorizing instant purchases without payment information, comprising:
   receiving, by one or more computing devices, a request for instant purchase of an item by a user, wherein the request does not include or require payment information to pay for the item, the item being purchased by the user from a provider;
   determining, by the one or more computing devices, whether the user is approved for instant purchase based on a prior account activity level associated with an account of the user;
   authorizing, by the one or more computing devices, the instant purchase in response to a determination that the user is approved for instant purchase;
   communicating, by the one or more computing devices, the authorization to the provider;
   obtaining, by the one or more computing devices, deferred payment of the instant purchase from the user after the user receives the item from the provider.

2. The method of claim 1, further comprising notifying, by the one or more computing devices, the user of the approved instant purchase and providing access to content associated with the approved instant purchase.

3. The method of claim 1, wherein the prior account activity level comprises a time limit of how long the user's account has been open.

4. The method of claim 1, wherein the prior account activity level comprises a prior purchase criteria, wherein the prior purchase criteria defines a minimum number of prior non-instant purchases completed by the user.

5. The method of claim 1, wherein the prior account activity level comprises a required activity level, wherein the required activity level defines a minimum frequency of purchases.

6. The method of claim 1, wherein the prior account activity level is based on an associated account activity level of one or more integrated online services.

7. The method of claim 6, wherein the one or more integrated online services is at least one of an associated email account, an associated cloud computing account, an associated electronic wallet account, and an online social networking account.

8. The method of claim 1, wherein obtaining deferred payment of the instant purchase comprises notifying the user of the account balance and requesting payment after an account balance limit or time limit is reached.

9. The method of claim 1, wherein obtaining deferred payment of the instant purchase comprises requesting authorization to process payment using payment information associated with the user's record after an account balance limit or time limit is reached.

10. The method of claim 1, wherein obtaining deferred payment of the instant purchase comprises processing payment using pre-authorized payment information associated with the user's record after an account balance limit or time limit is reached.

11. The method of claim 1, wherein the item is at least one of a ringtone, a music file, a video file, an online newspaper or magazine subscription, an electronic newspaper or magazine article, an electronic book, and a virtual good associated with a social network or online gaming application.

12. The method of claim 1, further comprising paying, by the computer, the provider for the item.

13. A computer program product, comprising:
a non-transitory computer-executable storage device having computer-readable program instructions embodied thereon that when executed by a computer cause the computer to authorize instant purchases without payment information, the computer-executable program instructions comprising:
computer-executable program code to receive a request for an instant purchase of an item by a user, wherein the request does not include or require payment information to pay for the item, the item being purchased by the user from a provider;
computer-executable program code to determine whether to authorize the instant purchased based on a prior account activity level associated with an account of the user;
computer-executable program code to authorize the instant purchase;
computer-executable program code to communicate the authorization of the instant purchase to the provider;
computer-executable program code to update a record of the user to include information regarding the approved purchase;
computer-executable program code to obtain deferred payment of the instant purchase from the user after the user receives the item from the provider.

14. The computer program product of claim 13, wherein the prior account activity level comprises a time limit of how long the user's account has been open.

15. The computer program product of claim 13, wherein the prior account activity level comprises a prior purchase criteria, wherein the prior purchase criteria defines a minimum number of prior purchases completed by the user.

16. The computer program product of claim 13, wherein the prior account activity level comprises a required activity level, wherein the required activity level defines a minimum frequency of purchases.

17. The computer program product of claim 13, wherein the prior account activity level is based on an associated account prior account activity level.

18. The computer program product of claim 17, wherein the associated account is at least one of an associated email account, an associated cloud computing account, an associated electronic wallet account, and an online social networking account.

19. The computer program product of claim 13, wherein obtaining deferred payment of the instant purchase comprises notifying the user of the account balance and requesting payment information after an account balance or time limit is reached.

20. The computer program product of claim 13, wherein obtaining deferred payment of the instant purchase comprises requesting authorization from the user to process payment using payment information associated with the user's account after an account balance limit or time limit is reached.

21. The computer program product of claim 13, wherein obtaining deferred payment of the instant purchase comprises processing payment using pre-authorized payment information associated with the user's record after an account balance limit or time limit is reached.

22. A system to authorize instant purchases without payment information, comprising:
a storage device; and
a processor communicatively coupled to the storage device, wherein the processor executes application code instructions that are stored in the storage device to cause the system to:
receive a request for instant purchase of an item by a user, wherein the request does not include payment information to pay for the item;
determine whether to authorize the instant purchase based on a prior account activity level associated with an account of the user;
communicate an authorization of the instant purchase to a provider of the item;
notify the user of the approved instant purchase and providing access for the user to content associated with the approved instant purchase; and
obtain deferred payment of the instant purchase from the user after the user receives the item from the provider.

23. The system of claim 22, wherein the prior account activity level comprises a time limit of how long the user's account has been open.

24. The system of claim 22, wherein the prior account activity level comprises a prior purchase criteria, wherein the prior purchase criteria defines a minimum number of prior non-instant purchased completed by the user.

25. The system of claim 22, wherein the prior account activity level comprises a required activity level, wherein the required activity level defines a minimum frequency of purchases.

26. The system of claim 22, wherein the prior account activity level is based on an associated account activity level of one or more integrated online services.

27. They system of claim 26, wherein the one or more integrated online services is at least one of an associated email account, an associated cloud computing account, associated electronic wallet account, and an online social networking account.

28. The system of claim 22, wherein the processor further executes application code instructions that are stored in the storage device to cause the system to update a record of the user to include information regarding the approved instant purchase.

29. The system of claim 22, wherein the processor further executes application code instructions that are stored in the storage device to cause the system to notify the user of the approved instant purchase and provide access to content associated with the approved instant purchase.

30. The system of claim 22, wherein obtaining deferred payment of the instant purchase comprises notifying the user of the account balance and requesting payment information after an account balance or time limit is reached.

31. The system of claim 22, obtaining deferred payment of the instant purchase comprises requesting authorization from the user to process payment using payment information associated with the user's account after an account balance limit or time limit is reached.

32. The system of claim 22, wherein obtaining deferred payment of the instant purchase comprises processing payment using pre-authorized payment information associated with the user's record after an account balance limit or time limit is reached.

* * * * *

UNITED STATES PATENT AND TRADEMARK OFFICE
CERTIFICATE OF CORRECTION

| | | |
|---|---|---|
| PATENT NO. | : 8,943,001 B1 | Page 1 of 1 |
| APPLICATION NO. | : 13/921148 | |
| DATED | : January 27, 2015 | |
| INVENTOR(S) | : Vikas Gupta | |

It is certified that error appears in the above-identified patent and that said Letters Patent is hereby corrected as shown below:

In the Claims:

Column 12, Claim 27, Line 53 should read "--The system of claim 26, wherein the one or more--"

Signed and Sealed this
Thirty-first Day of May, 2016

Michelle K. Lee
*Director of the United States Patent and Trademark Office*